United States Patent [19]
Arts et al.

[11] Patent Number: 5,789,535
[45] Date of Patent: Aug. 4, 1998

[54] METHOD OF PREPARING POLYMER GRANULES

[76] Inventors: Theo J. C. Arts, Valeriushof 15-B, 6215 GB Maastricht; Hans Colenberg, Marathon 1, 6245 EZ Eijsden; Joseph Pierre H. Theunissen, Verdistraat 2, 6245 GM Eijsden; Theo Jan Osinga, Bemelerweg 50, 6267 AN Cadier en Keer, all of Netherlands; Philip A. Lagar, 3 Hall Close, Kilsby, Rugby Warks CV23 8XZ; James M. Garvey, 3 Badgers Glade, Burghfield Common Reading, Berks RG7 3RQ, both of Great Britain

[21] Appl. No.: 623,644

[22] Filed: Mar. 28, 1996

[51] Int. Cl.$^6$ .................... C08F 6/10; C08F 6/24
[52] U.S. Cl. .............. 528/502 R; 528/481; 528/503; 34/368; 34/377
[58] Field of Search .................. 528/481, 483, 528/502 R, 503; 34/368, 377

[56] References Cited

U.S. PATENT DOCUMENTS 4,920,202  4/1990  Irie et al. .................. 528/500

FOREIGN PATENT DOCUMENTS 0 526 978 A2  2/1993  European Pat. Off. .

*Primary Examiner*—Fred Teskin
*Attorney, Agent, or Firm*—William K. Wissing; John D. Thallemer

[57] ABSTRACT

Methods of preparing granules which contain a water soluble or water dispersable polymer suitable for use in detergents are disclosed, in which a solution of the polymer in a liquid or a dispersion of the polymer in a liquid is formed into granules, in a single drying and granulation stage, wherein the polymer solution or dispersion is introduced into a substantially horizontal drum containing a multiplicity or rotating arms proximate its internal surface, which internal surface has an elevated temperature, and a gas is introduced into the drum at an elevated temperature via a gas inlet. Granules prepared by such methods may be used in detergent compositions, water treatment compositions, agrochemical compositions, adhesive compositions and cosmetic compositions, and may be used as pigment dispersants, mineral dispersants, cement additives, oil field additives, textile additives and paper additives.

14 Claims, 3 Drawing Sheets

METHOD OF PREPARING POLYMER GRANULES

FIELD OF THE INVENTION

This invention relates to the preparation of granules of water soluble or water dispersable polymers, suitable for use in detergents, granules obtained and the use of such granules for detergents, in particular.

BACKGROUND OF THE INVENTION

Granulated polymers are widely used in formulations where large quantities of water are undesirable, e.g., fabric washing powder, dishwashing powder, dishwashing tablets, water softening powder and -tablets, wettable powders containing agrochemicals. Polymers may be included to function as binders, dispersants, calcium sequestrants, etc.

Water soluble or water dispersable polymers in granular form are also used for a number of other applications, e.g., water treatment compositions, pigment dispersants, mineral dispersants, cement additives, oil field additives textile additive compositions, adhesives, cosmetics, paper additives, etc. In the following specification however, reference will be made to detergents, although the granules prepared are not limited to said use.

Detergent compositions are inter alia used for mechanical dishwashing and fabric washing. Detergent compositions intended for mechanical dishwashing (also known as machine dishwashing or automatic dishwashing) as well as for fabric washing usually require the presence of a component capable of binding Ca-ions (and Mg-ions) present in the washing liquor, said component usually being referred to as a builder.

Ca-ions (and Mg-ions) can react with alkali-metal-silicates, carbonates and soap to give a precipitate which is deposited onto the washed product, like dishes, fabrics, etc., being undesirable.

Conventional builders comprise phosphate (e.g., sodium triphosphate, generally refereed to as STP or STPP) and well known organic acids like citric acid, succinic acid, etc.

During the past all kinds of polymers have been increasingly used as co-builders enhancing the Ca and/or Mg binding performance.

In more recent mechanical dishwashing powders phosphate is being replaced for environmental reasons by the weaker organic acids or acid salts, preferably the sodium acid salt, e.g., of citric acid. In modern formulations polymers are generally used to enhance the Ca and Mg binding properties of the builders. These polymers also prevent redeposition of soil/dirt on the product washed and are generally applied at levels of about 1–10 weight percent in mechanical dishwashing powders.

Mechanical dishwashing detergent products are nearly exclusively produced by dry mixing of the various components in granular form. As a result of this development there is a growing demand for the above mentioned polymers in granular form with suitable properties, for incorporation in the detergent composition.

Co-granules have been developed, consisting of two or more components required in mechanical dishwashing. Generally these co-granules are based on silicate, sodium carbonate or sodium bicarbonate in conjunction with an organic component comprising one or more of the polymers.

These granules however frequently lack one or more of homogeneity, suitable flow properties, strength, solubility, bulk density and morphology to meet the requirements of the detergent formulator. Furthermore the freedom of the formulator is restricted in selecting the optimum ratios in the detergent product.

These co-granules known in the art are generally produced in a two-stage process, starting with a solution containing the components, which is dried in a drying stage, e.g., in a spray-drying tower, a ring dryer, a drum-type dryer, etc., giving a fine powder which can be compacted in a compactor as available on the market. With respect to compaction reference is made to U.S. Pat. No. 3,875,282 and U.S. Pat. No. 3,931,036. The compacted product leaving the compactor as a thin sheet is ground, milled and classified to the desired particle size by suitable sieves. Oversized and fine particles can be recycled through the compactor.

A disadvantage of such a compaction process is that due to the low yield of the desired particle size (approximately 200–1250 µm for detergent powders) excessive recycling is generally necessary (frequently more than 50%). Further the process is a two-stage process, which is complicated and not economic.

Fabric washing compositions especially when based on a zeolite as the main builder, in particular zeolite 4A, also require the presence of polymers as discussed above. Due to the fact that these products also are produced more and more by dry mixing processes it is essential that ingredients for such fabric washing compositions are provided as free flowing, non dusting granules of sufficient bulk density and solubility.

As a consequence also for fabric washing detergent powders there is an increasing demand for said polymers in granular form.

Polymers are usually used in fabric washing powders at levels of about 0.1–8 weight percent.

As the granules generally are transported pneumatically in the detergent composition producing factories, the particles should be sufficiently durable to minimize attrition, which causes fines and gives rise to dust problems. Further the polymer should preferably be sufficiently soluble or at least dispersable in water. It has been observed that cogranules produced by compacting fine powders containing these polymers have a tendency to attract moisture leading to sticky products and to agglomeration.

The main object of the present invention is to provide a method for preparing granules of said polymers in a single stage, said granules being sufficiently soluble, having the desired bulk density and showing minimum attrition.

SUMMARY OF THE INVENTION

The invention therefore provides a method of preparing granules comprising a water soluble or water dispersable polymer suitable for use in detergents, in which a solution of the polymer in a liquid or dispersion of the polymer in a liquid is formed into granules, in a single drying and granulation stage, wherein the polymer solution or dispersion is introduced into a substantially horizontal drum containing a multiplicity of rotating arms proximate its internal surface, which has an elevated temperature, and a gas is introduced into the drum at an elevated temperature. According to the invention excellent polymer granules are prepared in a single stage.

BRIEF DESCRIPTION OF THE DRAWINGS

The present invention will be illustrated by means of the accompanied drawings, in which.

DETAILED DESCRIPTION OF THE INVENTION

Figure 1:
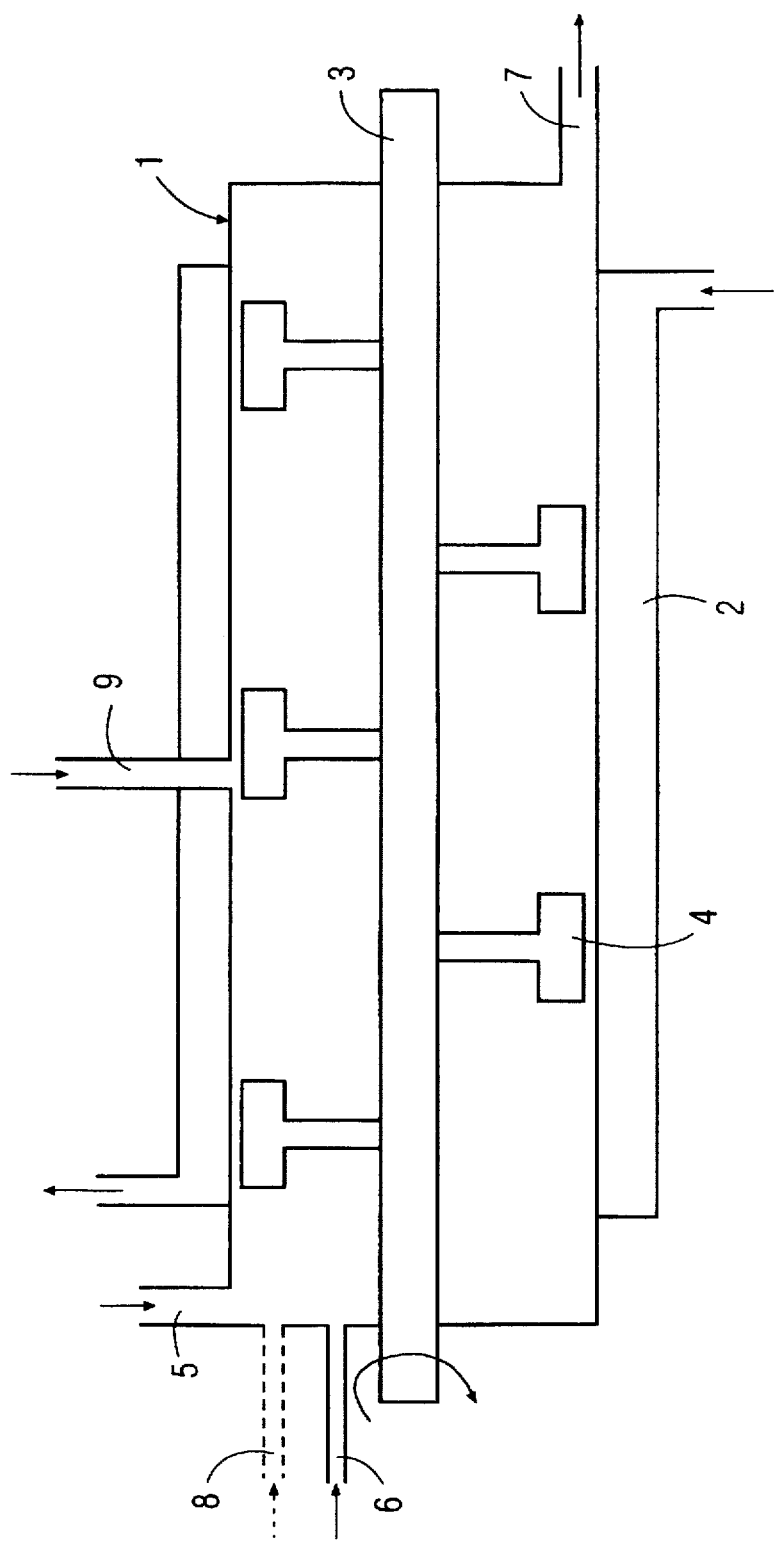
FIG. 1 shows a vertical diagrammatic section through a granulation apparatus according to the invention.

It is noted that the granules prepared according to the invention may also comprise other components which are useful for the specific application of the granules, e.g., for detergent composition components, like silicate components, surfactants etc., provided that these materials do not impede the granulation method. In this respect reference is made to EP-A-0 385 956 and U.S. Pat. No. 4,252,968.

EP-A-0 385 956 relates to a process for spheronization and a device for implementing said process. One or more powders are placed in a leaktight vessel having a substantially vertical axis comprising a bottom blade rotating about an axis parallel to the axis of said vessel. Further a single or multiple spheronizing rotating tool is present with a substantially discoidal form. The powders are mixed and a binder solution is added, wherein the composition of powders and binder solution is spheronized by using the spheronizing tool. In a final stage the spheronize material can be dried by fluidization. Drying of a polymer solution or dispersion in a substantially horizontal drum containing a multiplicity of rotating arms, proximate its internal surface is not disclosed.

U.S. Pat. No. 4,252,968 discloses a continuous process for preparing granular polycarbonate comprising feeding polycarbonate powder to a tubular substantially vertical drier equipped with a rotating mechanical stirrer, in which the powder is fluidized by means of a co-current stream of inert heated gas or vapor. In this process again fluidization is used instead of a drying operation in a substantially horizontal drum with rotating arms. Further in U.S. Pat. No. 4,252,968 the rotational speed is relatively low.

Preferably the polymer is selected from the following polymers or a mixture thereof:

polymers based on acrylic acid or methacrylic acid, copolymers thereof, or mixtures thereof;

polymers based on vinylacetate, including homopolymers, and copolymers with other monomers; and biopolymers.

The acrylic or methacrylic acid based polymers can be either homopolymers of these acids or mixtures thereof, copolymers with other monomers containing mono unsatured carbon-carbon bonds (-ienes) such as maleic acid, itaconic acid and vinylacetate maleic acid or of mixtures thereof. Preferred polymers are the homopolymers of acrylic acid and homopolymers of methacrylic acid and the copolymers of these acids with maleic acid and/or mixtures thereof. These polymers can be supplied either in the acidic form or in a neutralized (or partially neutralized) form after neutralization with an alkali, like an alkali metal hydroxyde solution.

The (meth)acrylic/maleic ratio of the copolymer is not specifically limited. However a ratio comprised between 0.5:1 mole ratio of (meth)acrylic acid/maleic anhydride and 3.5:1 mole ratio of (meth)acrylic acid/maleic anhydride is preferred.

The vinylacetate based polymer include homopolymers of vinylacetate as well as copolymers with other monomers, containing mono-unsaturated carbon-carbon bonds, such as maleic acid and itaconic acid.

The biopolymers are preferably starch and starch-derivatives.

Concerning the acrylic- or methacrylic acid based polymers, it is noted that the polymers can vary in molecular weight and in composition depending on the ratio of the monomers of (meth)acrylic acid and maleic acid used during polymerization and the degree of polymerization. The polymers are soluble in water and can be neutralized partially or completely by addition of alkali for example an alkali metal hydroxide, preferably sodium hydroxide.

These polymers in acidic or neutral form are on the market and are offered by National Starch and Chemical Company, Bridgewater, N.J. (U.S.) and National Starch and Chemical Specialty Polymers Limited, Braunston, Daventry, Northants (GB). Examples of such products as supplied by National Starch are:

| TRADEMARK | PRODUCT |
|---|---|
| Alcosperse 465 | a copolymer in acidic form |
| Alcosperse 175 | a copolymer in neutralized form |
| Alcosperse 659 | a homopolymer in acidic form |
| Alcosperse 602N | a homopolymer in neutralized form |

In the method according to the invention a solution or dispersion of the polymer in a liquid is used. It is meant also to comprise emulsions and the like. Said liquid is not specifically limited, but is preferably a polar solvent and more preferably an aqueous solution or dispersion of the polymer is used.

The solution or dispersion used advantageously comprises 20–60% by weight, preferably 35 to 60% by weight of the polymer and more preferably 40 to 50% by weight thereof.

The gas introduced into the drum advantageously is an inert gas and preferably air is used. The gas serves as a drying medium for drying the polymer solution or dispersion and discharging the evaporated solvent.

Preferably the polymer solution or dispersion is introduced into the upper region of the drum and the gas is introduced into the lower region of the drum via a gas inlet. In this manner the single stage drying according to the invention is optimized.

It is essential, that the internal surface wall of the drum is heated, and preferably to a temperature between 80° C. and the decomposition temperature of the polymer, more preferably between 120° C. and 200° C., and most preferably between 150° C. and 170° C.

The gas introduced is also heated, preferably to a temperature between 80° C. and 350° C., more preferably between 120° C. and 250° C., and most preferably between 150° C. and 200° C.

It will be clear for an ordinary expert, that the specific temperatures of the wall and the gas are selected depending on the specific circumstances, i.e., the solids content of the solution or dispersion, the temperature thereof, the dimensions of the drum, the rotational speed of the rotating arms, etc.

Said rotational speed of the arms is preferably controlled such that the tip speed of the arms is comprised between 15 m/s and 28 m/s, preferably comprised between 20 m/s and 24 m/s. The tip speed is the speed of the tips of the arms, which can be designed in the form of paddles, blades or ploughs or the like, relative to the inner surface of the drum.

The temperature of the polymer solution is of course not critical and can be selected from between ambient temperature to the boiling temperature thereof and for practical reasons a temperature between 50° C. and 90° C. is preferred.

With the method according to the invention granules with a wide range of particle sizes can be prepared. In particular the average particle size of the granules prepared is comprised between 0.1 mm and 2 mm, and preferably between 0.2 mm and 1.2 mm.

In a specific embodiment of the method according to the invention the granules having an average particle size of below 0.2 mm and above 2 mm are recycled. Advantageously said granules having an average particle size of below 0.2 mm are recycled by introduction thereof into about the center portion of the drum.

By recycling the particles being too large and too small, a very efficient and economic method is obtained. The selection of the center portion of the drum provides the additional advantage, that the particles do not have to be redissolved, before entering the drum, but can be introduced as dry particles, mixing with the material inside the drum which is formed into granules. The exact location of said introduction into the drum is not very critical, but the center portion, i.e., seen in the transport direction of the material, is preferred.

The recycled particles can also be redissolved in the solution fed to the drum, or fed near or with the gas stream.

The invention also provides granules comprising a water soluble or water dispersable polymer, suitable for use in detergents, obtainable by the method according to the invention. Said granules preferably have a moisture content of below 15% by weight, and preferably between 5% and 10% by weight. The solubility of the granules is preferably such that the granules dissolve as fast as possible, e.g., within 3 minutes in water of 20° C., and preferably within 2 minutes. The ball mill friability of the granules is preferably below 10%.

With the method according to the invention, the bulk density of the granules can be adjusted and said bulk density is preferably comprised between 300 g/l and 800 g/l.

Further a detergent composition is provided comprising granules according to the invention.

The use of the granules according to the invention is not limited to detergent compositions, but these granules also preferably are used for a water treatment composition, a pigment dispersant, a mineral dispersant, a cement additive, an oil field additive, a textile additive composition, an adhesive, a paper additive, an agrochemical, or cosmetic formulation.

Finally, as represented in FIG. 1, a device is provided suitable for performing the method according to the invention at least comprising a tubular drum (1) with heating means (2) for heating the inner surface of the drum, a rotatable shaft (3) with a multiplicity of arms (4) proximate said inner surface, feed means (5) for a solution or dispersion to be dried, feed means (6) for drying-gas and discharge means (7) for dried material and gas, characterized in that feed means (9) are present near about the center of the drum for introducing recycled dried material.

In the following the test methods are discussed as used to determine the properties of the granules obtained in the examples.

Test Methods

Bulk density: A cylinder (height/diameter ratio of approximately 2, is filled with powder to a measured volume of 1 liter and the sample is weighed.

Ball mill friability (BMF): This measures the breakdown of granules under conditions representing high shear mixing. The sample of granulate is sieved to remove oversize (>1200 μm) and undersize (<200 μm) and then split into two parts. One part is used to measure the size distribution by sieving. The other part is put in the ball mill.

The ball mill is a 10 cm×10 cm cylinder, containing 50 porcelain balls of 1 cm diameter and operated at 90 rpm, while set at a declination of 16 degrees. After 5 minutes milling the sample is removed and sieved to determine the size distribution. Ball mill friability is expressed as the percentage increase in fines <200 μm.

Particle size: Measured using standard sieves (Retsch).

Moisture content: 2 grams of material are transferred to a clean aluminum dish and put into a forced draught oven, maintained at a temperature of 130° C. The sample is kept in the oven for 1 hour, after which it is cooled and reweighed as quickly as possible. The weight loss represents the moisture content.

An example of the method of the invention will now be given to illustrate but not limit the invention.

The apparatus used is shown in FIG. 1 and comprises a double walled tubular drum (1) mounted horizontally. Heated oil was passed through the double wall cavity (2) to heat the inner surface of the drum to a required temperature. The drum had a length of 2 meters and a diameter of 0.35 meters. Along the cylindrical axis was positioned a rotatable shaft (3) having about 100 arms (4) equally spaced along its length with arms (4) fixed at each contact point. These arms have paddle ends which extend to be almost in contact with the inner wall. The shaft was rotated at 1200 rotations per minute being equal to a tip speed of 22 m/s, i.e., being the speed of the tips of the paddle ends.

An acrylic acid/maleic acid copolymer solution, having an acrylic/maleic ratio of approximately 3:1 and a molecular weight of approximately 70,000, at a density of approximately 1.3 kg/l (45% d.s.) was sprayed into the drum at an inlet (5) just above the axis at one side of the drum at a rate of about 70 kg/hour at a temperature of 60° C. Air heated to 190° C. by an heat exchanger entered the drum at a rate of 600 m$^3$/h at an inlet (6) next to the axis and close to the point where the polymer solution was introduced at the same end of the drum (i.e., co-current). The granular polymer product and air left the drum at the other end of the drum through conduit (7). The drum wall temperature was maintained at 160° C.

The polymer used was a copolymer or acrylic acid and maleic acid, Alcosperse 475 from National Starch and Chemical Company, Bridgewater, N.J. (U.S.).

The polymer solution was rapidly broken into droplets by the force of the air movement and then impacted against the drum wall by the rotational energy of the paddles. The droplets were continuously impacted with the wall as they progressed through the drum under the force of the air.

The polymer product was drawn off at the lowest point of the drum and was found to be substantially spherical particles having a particle size distribution of

| | |
|---|---|
| 50% | below 250 micron |
| 35% | 200 to 1,000 micron |
| 15% | above 1,000 micron |

The product did not stick to the drum wall or the moving parts and was free flowing. It had a water content of 8%, a bulk density of 480 g/l and a ball mill friability of below 5% for particles above 200 micron.

It was sieved to provide the desired product with a particle range of 0.2 mm to 1.2 mm after separation from the air and steam by means of a cyclone. The particles outside this range can be recycled by addition of the polymer solution.

In a comparative example the polymer solution was run under the same conditions. However fines were reintroduced into the apparatus via a dosing screw via (9). The weight ratio of fines to feed stream was 1:1. Instead of reintroducing the fines via the dosing screw (9), these can also be reintroduced via (8) however it appeared to be more efficient to reintroduce via (9). Therefore the feed (8) has been dotted.

The polymer product was drawn off at the lowest point of the drum and was found to be substantially spherical particles having a particle size distribution of

| | |
|---|---|
| 53% | below 250 micron |
| 35% | 200 to 1,000 micron |
| 12% | above 1,000 micron |

The product did not stick to the drum wall or the moving parts and was free flowing. It had a water content of 8%, a bulk density of 480 g/l and a ball mill friability of below 5% for particles above 200 micron.

It was sieved to provide the desired product with a particle range of 0.2 mm to 1.2 mm after separation from the air and steam by means of a cyclone. The particles below 0.2 mm were recycled via (9).

The above two examples were also performed with the polymer Alcosperse 175 of National Starch and Chemical Company, providing similar results.

In the following the moisture pick-up and the solubility of the granules according to the invention is compared with granules prepared by compacting a spray-dried powder.

Figure 2:
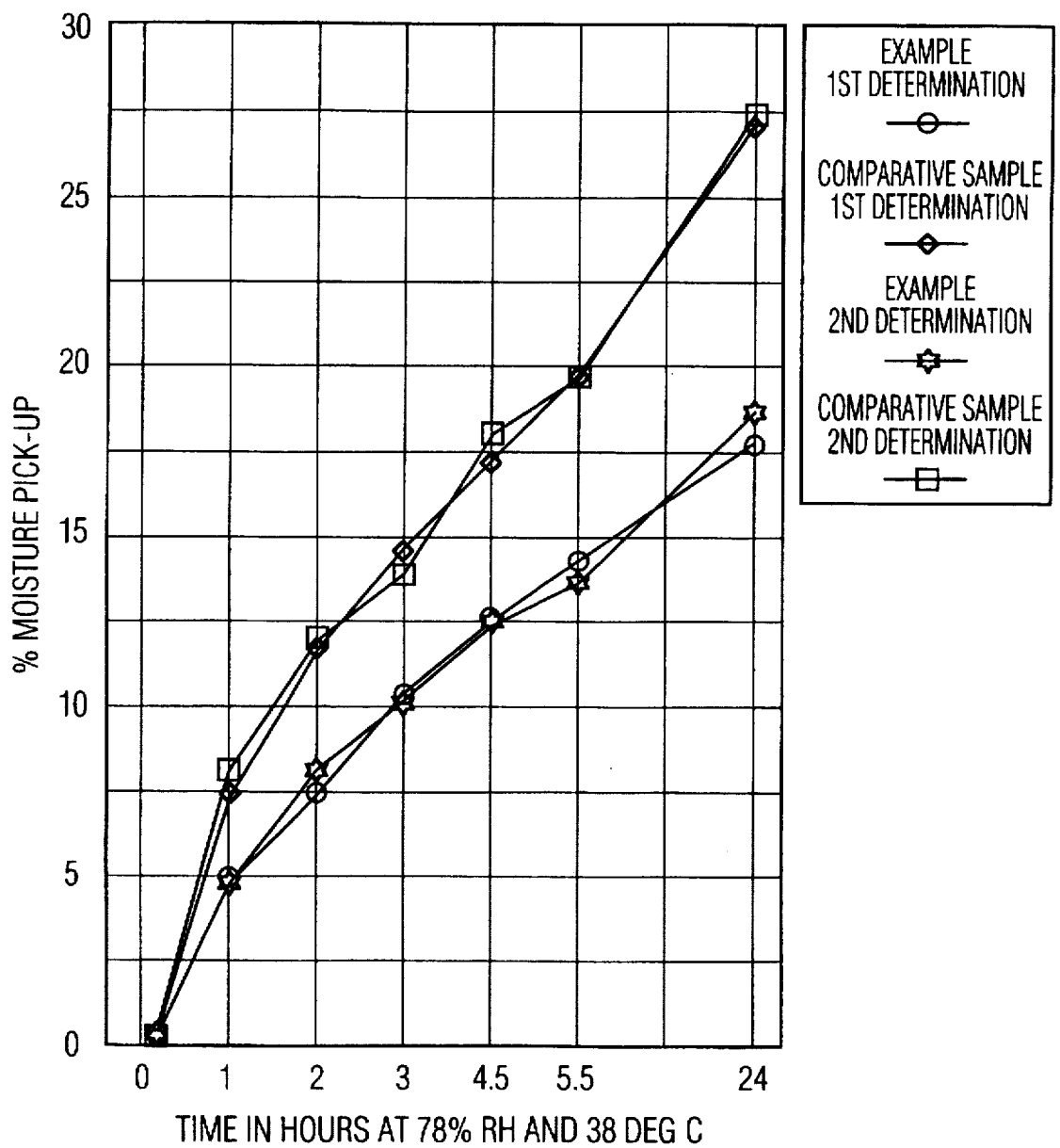
FIG. 2 shows a graph of the moisture pick-up vs the time of granules according to the invention and granules obtained by compaction.

FIG. 2 shows the moisture pick-up of granules as prepared according to the invention and described in the example, being compared to granules also prepared from Alcosperse 475, in which the same solution is spray-dried using a gas inlet temperature of 260°–275° C. and a gas outlet temperature of 98°–110°C. Thereafter the dry powder with a maximum water content of 10% was compacted using the method according to U.S. Pat. No. 3,875,282. The granules were sieved to provide the product with a particle range of 0.2–1.2 mm. Approximately 5 grams of both samples of granules was weighed into an aluminum dish and placed in a humidity cabinet set at 78% R.H. and 38° C. The sample was reweighed at set times and the weight increase was determined as a percentage of the initial weight. The results are shown in FIG. 2. The moisture pick-up of the example according to the invention and the comparative example according to the prior art were both determined twice. It is clear that the moisture pick-up of the granules of the invention is much lower than with the compacted granules.

Figure 3:
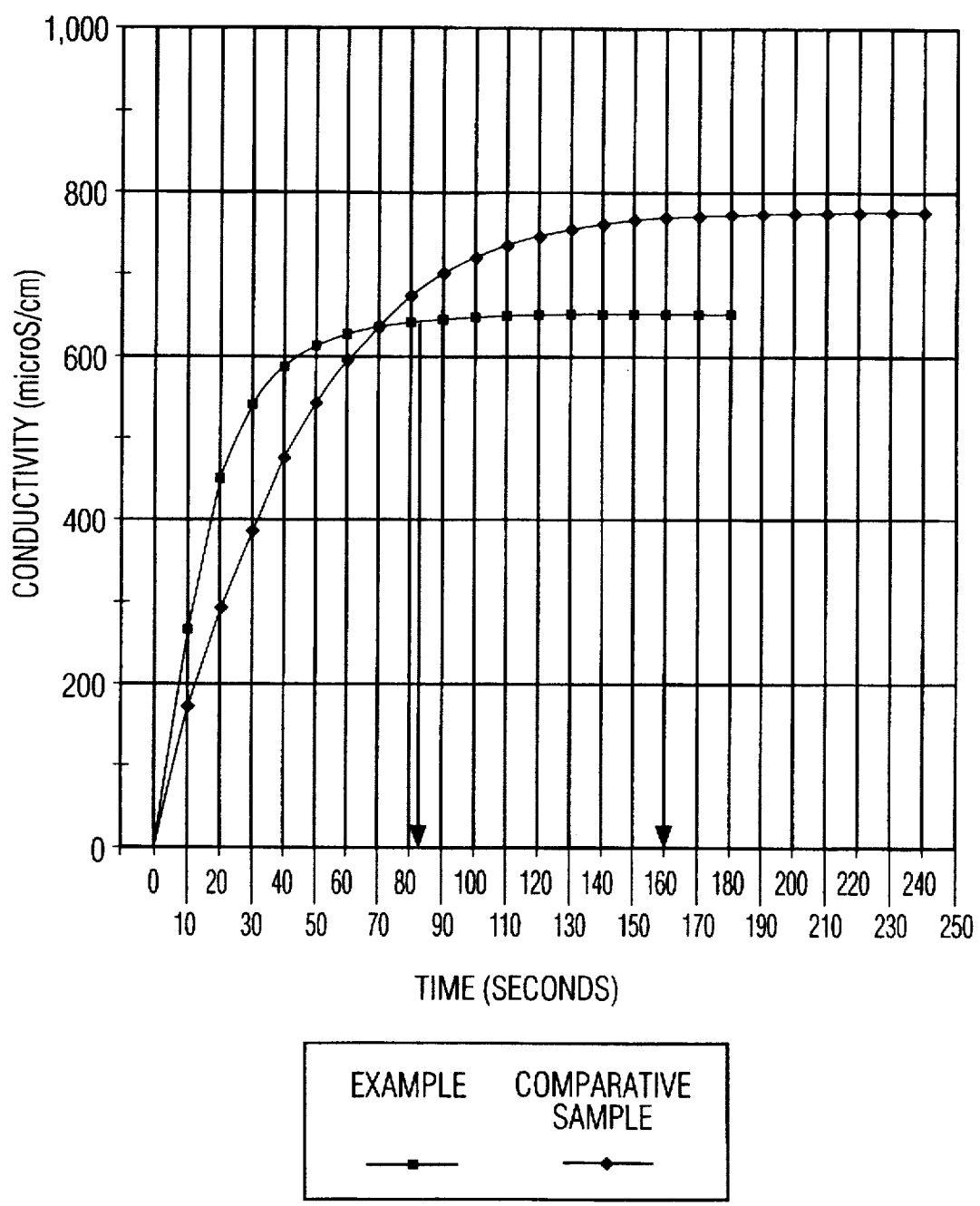
FIG. 3 shows a graph of the conductivity vs the time of granules according to the invention and granules obtained by compaction.

For measuring the solution time of the same two granular products as described above 1.5 g powdered polymer (0.2–1.2 mm) was weighed. 500 ml deionized water was introduced into a bottle and was stirred. A conductivity electrode was inserted and the stirring speed was adjusted until a vortex just formed. The weighed powder was added to the stirred water and at the same time a stopwatch was started. The conductivity for each sample was measured at 10 second intervals up to 1 minute and at 30 second intervals thereafter up to 3 minutes, or until two consecutive readings were the same. The result is plotted in the graph according to FIG. 3. A standard potassium chloride solution was used as a control. It is clear that the solubility of the polymer according to the invention is superior to the solubility of the polymer granules as prepared by compaction.

We claim:

1. A method of preparing granules comprising a polymer suitable for use in detergents, in which a solution of the polymer in a liquid or a dispersion of the polymer in a liquid is formed into granules having an average particle size in the range from 0.1 mm to 2 mm, in a single drying and granulation stage, wherein the polymer solution or dispersion is introduced into a substantially horizontal drum containing a multiplicity of rotating arms proximate its internal surface, said internal surface having an elevated temperature, contacting the polymer solution or dispersion with a gas which is introduced into the drum at an elevated temperature via a gas inlet, whereby the gas serves as a medium for drying the polymer solution or dispersion, thereby evaporating the liquid from the polymer solution or dispersion, and whereby the gas serves as a medium for discharging the evaporated liquid; and discharging the granules, the gas and the evaporated liquid via a discharge means, thereby producing the granules in a single drying and granulation stage.

2. The method according to claim 1 wherein the polymer is selected from the group consisting of polymers prepared from acrylic acid, polymers prepared from methacrylic acid, polymers prepared from vinylacetate and polymers made from starch and starch derivatives.

3. The method according to claim 1 wherein the solution or the dispersion comprises 20% to 60% by weight of the polymer.

4. The method according to claim 1 wherein the solution or the dispersion comprises 35% to 60% by weight of the polymer.

5. The method according to claim 1 wherein the polymer is selected from the group consisting of an acrylic acid homopolymer, a methacrylic acid homopolymer, a copolymer of acrylic acid and maleic acid, and a copolymer of methacrylic acid and maleic acid.

6. The method according to claim 1 wherein the gas is inert.

7. The method according to claim 1 wherein the polymer solution or the polymer dispersion is introduced into an upper region of the drum and the gas is introduced into a lower region of the drum.

8. The method according to claim 1 wherein the temperature of the internal surface of the drum is between 80° C. and the decomposition temperature of the polymer.

9. The method according to claim 1 wherein the temperature of the internal surface of the drum is between 120° C. and 200° C.

10. The method according to claim 1 wherein the gas inlet temperature is between 80° C. and 350° C.

11. The method according to claim 1 wherein the gas inlet temperature is between 120° C. and 250° C.

12. The method according to claim 1 wherein the rotational speed of the rotating arms is controlled such that the tip speed of the rotating arms is between 15 m/s and 28 m/s.

13. The method according to claim 1 wherein granules having an average particle size of below 0.2 mm and granules having an average particle size above 2 mm are recycled.

14. The method according to claim 13 wherein the granules having an average particle size of below 0.2 mm are recycled by introduction thereof into about the center portion of the drum.

* * * * *